W. H. MEYER.
MOTION PICTURE PROJECTOR.
APPLICATION FILED JAN. 30, 1918.
1,413,050.
Patented Apr. 18, 1922.
2 SHEETS—SHEET 2.
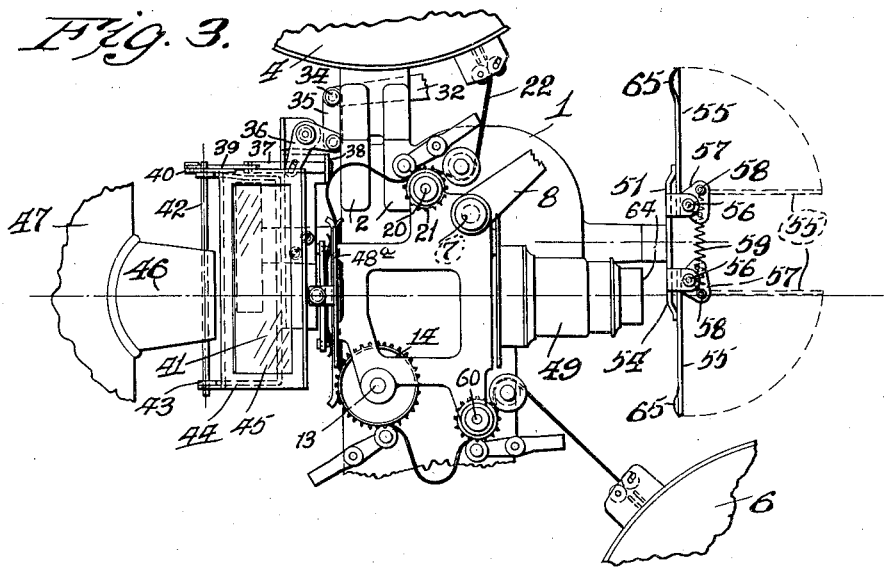
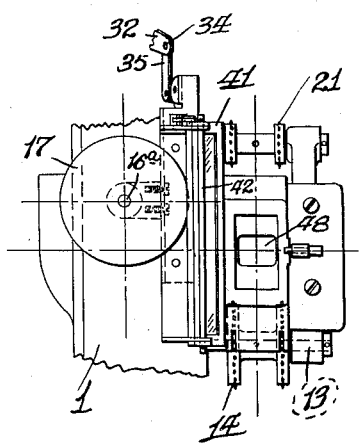
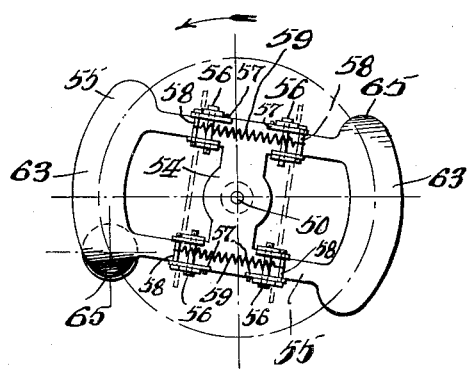
Inventor:
William H. Meyer.
By H. G. Fletcher
atty.

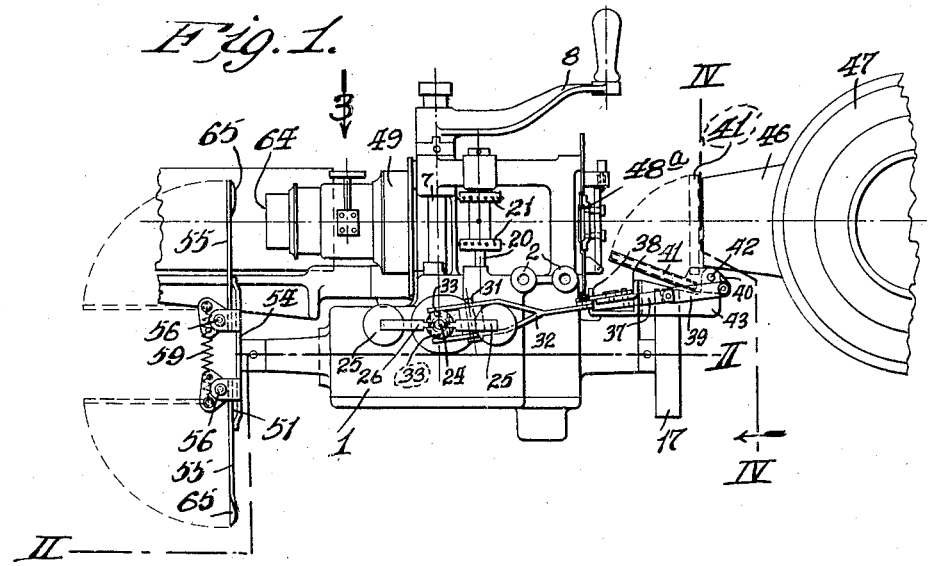

UNITED STATES PATENT OFFICE.

WILLIAM H. MEYER, OF ST. LOUIS, MISSOURI.

MOTION-PICTURE PROJECTOR.

1,413,050. Specification of Letters Patent. Patented Apr. 18, 1922.

Application filed January 30, 1918. Serial No. 214,527.

*To all whom it may concern:*

Be it known that I, WILLIAM H. MEYER, a citizen of the United States of America, and a resident of the city of St. Louis and State of Missouri, have invented certain new and useful Improvements in a Motion-Picture Projector, of which the following is a specification.

The primary object of this invention is to provide an improvement in motion picture projectors so that the film will be protected from burning from the projecting rays of the lamp.

Another object is to provide an improvement in a motion picture projector so that the same can be used during lectures, in which the film can be held stationary or run slowly for any length of time without danger of being ignited by the heat of the projecting rays.

A further object is to provide an improvement in an intermittent shutter relative to a picture projector.

A still further object is to provide a cooperative improvement relative to the fire shutter and intermittent shutter so that they will work in harmony with one another.

Other and further objects will appear in the specification and be specifically pointed out in the appended claims, reference being had to the accompanying drawings exemplifying the invention, and in which, Figure 1 is a plan view of a motion picture projector, with the upper reel housing removed, showing the aforesaid improvements applied thereto.

Figure 2 is a longitudinal vertical section taken on the line II—II of Fig. 1.

Figure 3 is a fragmentary side elevation of Fig. 1 taken in the direction of arrow 3.

Figure 4 is an end elevation taken on the line IV—IV of Fig. 1.

Figure 5 is a front elevation of the improved intermittent shutter taken in the direction of the arrow 5 of Fig. 2.

Referring to the drawings, 1 designates the housing and formed on the top of said housing are a pair of bosses 2 and secured to said bosses is a bracket 3 for supporting the unwinding reel housing 4.

Secured to the underside of the housing is a depending bracket 5 which is for the support of the winding reel housing 6. Arranged transversely in said housing is a crank shaft 7, and secured to the outer extending end of said shaft is a crank 8.

Rigidly mounted to the shaft 7 is a worm gear 9, said gear meshing with the worm shaft 10. Rigidly secured to the worm shaft 10 is an intermittent cam 11, said cam being in driving engagement with the intermittent gear 12 which is mounted on the intermittent shaft 13, and secured to said shaft 13 is the intermittent film driving sprocket 14, said sprocket being located adjacent the lower end of the housing 1.

Secured to the shaft 10 adjacent the cam 11 is a gear 15 in mesh with the pinion 16 which is mounted on the fly wheel shaft $16^a$ of the fly wheel 17.

Secured to the shaft 7 is a combined bevel and spur gear 18, the spur teeth of said gear meshing with the pinion 19 which is rigidly secured to the shaft 20, and secured to said shaft is the film feeding sprocket 21, which meshes with the teeth openings formed in the film 22. Meshing with the bevel teeth of the gear 18 is a bevel pinion 23 which is secured to the lower end of the vertically arranged governor shaft 24.

Swingingly secured to the upper end of said shaft 24 are the governor ball arms 25 of the governor 26, and connected to each of said arms is a link 27, the lower ends of said links being swingingly secured to the governor shaft sliding sleeve 28, and formed in the lower end of said sleeve is an annular recess 29.

Extending from the top of the housing 1 is a lug 30, and swingingly mounted on said lug by the fulcrum 31 is a lever 32 which is bifurcated at one end, the bifurcated end of said lever straddling the recess 29 of the sleeve 28, and there being guiding pins 33 carried by said lever engaging said recess.

Pivotally connected at 34 to the lever 32 is a link 35, the opposite end of said link being connected to a bell crank 36, said bell crank at one end having a sliding connection with the sliding link 37, which is reciprocally mounted in the guiding ears 38. Connected to one end of said link 37 is a swinging link 39, said link being connected at its opposite end to the hinge portion 40 of the fire shutter 41 which is swingingly secured at 42 to the rigid support 43. This fire shutter 41 consists of a frame 44, having an insert 45 of translucent material or the like, and is adapted to co-operate with the projecting end 46 of the lamp 47, said projecting end 46 being in alinement with the opening or aperture 48 formed adjacent one end of the projecting lens tube 49 across which the film passes.

Arranged above the shaft 10 and projecting from the housing 1 is a shaft 50, said shaft having mounted on its extended end an intermittent revolving shutter 51, the inner end of said shaft having a pinion 52 secured thereto, said pinion being in mesh with a pinion 53 which is mounted on the worm shaft 10.

The intermittent shutter 51 comprises a centrally arranged portion 54, to which is swingingly secured a pair of oppositely disposed swingingly mounted blades 55, said blades being swingingly secured to said portion 54 by the pintles 56, said pintles passing through pairs of wings 57 of said blades, each of said pairs of wings supporting a pin 58.

Connecting each pair of pins 58 of which there are two pairs relative to said blades 55, is a coil spring 59, said springs tending to pull the outer ends of the blades 55 towards the center of the shaft or axis 50.

In the operation of the device, the film 22 is fed from the upper reel housing 4 in the usual manner, (such as by the sprocket 21) between the aperture plates 48ª, and by the intermittent sprocket 14, after which the film is fed to the winding drum by the sprocket 60, which is driven by the mitre gearing 61 of the reel winding shaft 62, which relates to the winding of the film in the lower reel housing 6, the power for feeding the film being derived from the shaft 7 when the handle 8 thereof is manipulated by the operator, and the worm gear 9 will drive the worm shaft 10, cam 11 and intermittent gear 12, power also being transmitted to the governor shaft 24, thereby operating the governor 26, in which the sleeve 28 which is slidably mounted on said governor shaft 24 is elevated, thereby manipulating the lever 32, and applying a pushing force on the links 37 and 39, thereby swinging the fire shutter 41 from adjacent the mouth of the projecting end 46 of the lamp 47 to the position as shown in full lines in Fig. 1.

Simultaneously with the aforesaid operation the shaft 50 is driven through the gearing 52 and 53, and the intermittent shutter 51 is revolved, the blades 55 carried thereby being thrown outwardly to an approximate right angle position relative to the shaft 50, the cutting off portions 63 of each of said blades passing through the projecting ray of light which is emitted from the forward end 64 of the projecting lens tube 49, the purpose of said cutting off portions being for cutting off the projecting light ray at the time when the film is shifted.

When the device is running on or about the proper speed relative to projecting pictures on a screen, the fire shutter 41 is thrown out of the projecting path of light from the lamp 47, but when the device is operated below the given speed, the fire shutter will be swung to a closing position relative to the projecting portion 46 of the lamp 47, as shown in dotted lines in Fig. 1.

As afore related in one of the objects of this invention it is the intent and purpose to protect the film as it is running slowly past the aperture 48 or when the film is stopped as it is well known how the heat from the lamp will quickly ignite that portion of the film adjacent the aperture. Therefore, in a device of this character which is used in lecturing halls, in which it is often required that the film be run slow or entirely stopped for a space of time in order to dwell on a particular portion of the picture projected on the screen, it is essential that some sort of an automatic protector be used. In this connection, attention is called to the fire shutter which bears the translucent portion, which is designated by 45, which when swung into the path of projecting light will subdue the light enough to protect the slow moving or stationarily held film from ignition.

When the machine, however, is operating at the proper speed, the fire shutter 41 bearing the translucent portion will be swung out of the path of projecting light as related.

Referring to the intermittent shutter which is designated as 51, the blades 55 thereof are timed relative to the shifting of the film adjacent the aperture 48, so that the cutting-off portions 63 of said blades will engage and travel through the projecting ray from the lens tube 49 at the time when the film is jumped across the aperture 48, such operation, however, being ordinary with the present type of projecting devices, but in an improvement of this character in which the film at times is to be operated slowly or stopped, the intermittent shutter herein described and shown is adapted to co-operate. In this connection, attention is called to said blades 55 which are swingingly mounted at 56 to the centrally arranged portion 54, said blades, when the picture projector is being operated at the proper speed, being in their extended positions, as shown in full lines in Figs. 1, 2, 3 and 5, said blades being moved in said positions by centrifugal force, and in order to assist said blades in sustaining their approximate right angled positions, a deflecting portion 65 is formed on the forward end of each of said blades, said blades cutting into the surrounding atmosphere and tending to assist the centrifugal force in holding said blades against the portion 54.

When the speed, however, is reduced in running the device slowly or upon stopping, the springs 59 will overcome the centrifugal force, thereby drawing the outer ends of said blades towards parallel positions relative to the axis 50, and drawing the cutting-off portions 63 of said blades from the projecting path or line of the projecting lens tube 49. It is to be noted that this drawing-in action of the blades 55 when moved out of the projecting path of light, will prevent shadows from being thrown on the screen during the slow operation of the projector, as against the type of intermittent shutters now commonly in use, which are held out in a fixed position.

Furthermore in the present type of intermittent shutters, the projecting light portion thereof is sometimes held in a position wholly or partially cutting off the projecting ray of light when the machine is stopped, in which the operator has to reach forward and push the cutting-off portion of the shutter out of the path of projecting light, whereas with this improved intermittent shutter, when the device is stopped, the blades 55 are automatically moved from the projecting ray of light.

What I claim is:

1. In a motion picture projector, a projecting lens tube, a light emitting element, a fire shutter movably mounted between said tube and said element, a film driving mechanism, an intermittent foldable shutter driven by said mechanism, and a governor co-operable with said mechanism and said fire shutter, said intermittent shutter when folded adapted to allow the light rays to project from said tube.

2. In a motion picture projector, a projecting lens tube, a light emitting element, a fire shutter movably mounted between said tube and said element, a film driving mechanism, an intermittent shutter driven by said mechanism, having a collapsible cut-off portion, a governor co-operable with said mechanism, and said fire shutter, said cut-off portion of said intermittent shutter being co-operable with said mechanism, and adapted to travel to and away from the path of light emitted from said projecting tube when said mechanism is driving, and to remain out of the path of light when said mechanism is stopped.

3. In a motion picture projector, a film driving mechanism, a governor co-operable with said mechanism, a translucent fire shutter controlled by said governor, and an intermittent shutter co-operable with said mechanism and said fire shutter adapted to become automatically inactive on the light rays projecting through said fire shutter, when said fire shutter is active on the light rays.

4. In a motion picture projector, a projecting tube, a light emitting element, a fire shutter movably mounted between said tube and said element, a film driving mechanism, a revolving intermittent shutter driven by said mechanism having a cut-off portion adapted to travel towards and away from its axis, said cut-off portion of said intermittent shutter being co-operable with said fire shutter in which said cut-off portion becomes inactive on a projecting light ray when said fire shutter becomes active on the projecting light ray.

5. An intermittent shutter for a film driving projector, comprising a revoluble shaft arranged parallel to the projecting light ray of the projector, a cut-off member carried by said shaft, and extending therefrom into the projecting ray from the projector, and means for moving said cut-off member towards and away from said shaft and from the projecting ray of light while said axis is being revolved.

6. An intermittent shutter for a film driving projector comprising a revolubly mounted shaft arranged parallel to the projecting light ray of the projector, a collapsible cut-off member carried by said shaft, and means for drawing said cutoff member towards said shaft as said shaft is being revolved.

7. The combination of a projecting lens tube and an intermittent shutter, said shutter comprising a shaft arranged parallel to said tube, and a member carried by said shaft movably connected thereto adapted to variably cross the projecting line of said tube, and means provided between said shaft and said member for moving said member out of the projecting line of said tube.

8. The combination of a projector lens tube and an intermittent shutter, said shutter comprising a shaft arranged parallel to said tube, and a member carried by said shaft swingingly connected thereto adapted to cross the projecting line of said tube, and means carried by said shaft secured to said member for moving said member towards said shaft.

9. An intermittent shutter for a film driving projector comprising a revoluble shaft arranged parallel to the projecting light ray of the projector, a plurality of blades swingingly carried thereby adapted to centrifugal movement from said shaft, and means carried by said shaft for tending to draw said blades inwardly.

10. An intermittent shutter for a film driving projector comprising a revoluble shaft, a blade swingingly mounted thereto adapted to centrifugal movement from said shaft, arranged parallel to the projecting light ray of the projector, means tending to draw said blade towards said shaft, and a deflecting portion carried by said blade tending to hold said blade from being drawn towards said shaft.

11. An intermittent shutter for a film driving projector comprising a revoluble shaft, a body portion secured to said shaft, a pair of oppositely disposed swingable blades mounted from different centers to said body portion adapted to centrifugal movement from said shaft, and means secured to said blades for tending to draw them into parallelling positions with said shaft.

WM. H. MEYER.